(12) United States Patent
Hettwer et al.

(10) Patent No.: US 10,999,058 B2
(45) Date of Patent: May 4, 2021

(54) SYSTEM-ON-CHIP AND SECURITY CIRCUIT INCLUDING A SYSTEM-ON-CHIP OF THIS TYPE

(71) Applicant: Robert Bosch GmbH, Stuttgart (DE)

(72) Inventors: Benjamin Hettwer, Stuttgart (DE); Stefan Gehrer, Erfurt (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 16/165,543

(22) Filed: Oct. 19, 2018

(65) Prior Publication Data

US 2019/0132113 A1    May 2, 2019

(30) Foreign Application Priority Data

Oct. 27, 2017  (DE) .......................... 102017219321.2
Oct. 4, 2018   (DE) .......................... 102018217016.9

(51) Int. Cl.
| | |
|---|---|
| *H04L 9/00* | (2006.01) |
| *G09C 1/00* | (2006.01) |
| *G06F 21/76* | (2013.01) |

(52) U.S. Cl.
CPC .............. *H04L 9/003* (2013.01); *G06F 21/76* (2013.01); *G09C 1/00* (2013.01)

(58) Field of Classification Search
CPC .......... G06F 21/76; G06F 21/70; G06F 21/75; G06F 21/64; H04L 9/003

See application file for complete search history.

(56) References Cited

U.S. PATENT DOCUMENTS

| | | | | |
|---|---|---|---|---|
| 5,978,862 A | * | 11/1999 | Kou ....................... | G06F 13/387 710/14 |
| 6,011,407 A | * | 1/2000 | New ................ | H03K 19/17732 326/39 |
| 7,650,585 B1 | * | 1/2010 | Miller ..................... | G06F 30/34 716/138 |
| 8,020,131 B1 | * | 9/2011 | Van Mau ................ | G06F 30/34 716/116 |
| 2002/0129325 A1 | * | 9/2002 | Tanaka .................... | G06F 30/30 716/103 |
| 2015/0074159 A1 | * | 3/2015 | Poschmann .............. | G09C 1/00 708/270 |
| 2015/0171870 A1 | * | 6/2015 | Parker ............. | H03K 19/17768 380/44 |
| 2019/0140650 A1 | * | 5/2019 | Ikeura ..................... | G06F 11/00 |

* cited by examiner

*Primary Examiner* — Ali D Abyaneh
(74) *Attorney, Agent, or Firm* — Norton Rose Fulbright US LLP; Gerard Messina

(57) ABSTRACT

A system-on-chip includes a processing system, a memory connected to the processing system, and a programmable logic circuit connected to the memory, where the processing system is configured to store different circuit configurations in the memory according to a predefined netlist, and the system is configured to repeatedly adapt the circuit to the circuit configurations stored in the memory.

9 Claims, 3 Drawing Sheets

SYSTEM-ON-CHIP AND SECURITY CIRCUIT INCLUDING A SYSTEM-ON-CHIP OF THIS TYPE

CROSS-REFERENCE TO RELATED APPLICATIONS

The present application claims priority under 35 U.S.C. § 119 to DE 10 2017 219 321.2, filed in the Federal Republic of Germany on Oct. 27, 2017 and to DE 10 2018 217 016.9, filed in the Federal Republic of Germany on Oct. 4, 2018, the content of each of which are hereby incorporated by reference herein in their entireties.

FIELD OF THE INVENTION

The present invention relates to a system-on-chip (SoC) and to a security circuit including such a system.

BACKGROUND

The security of known cryptographic systems is more prone to be breached through attacks on the implementation than through traditional cryptanalysis. For this purpose, an attacker can make use of the connections between power consumption, computing time, or electromagnetic radiation in the form of a so-called side-channel attack (SCA).

US 2015/0171870A1 thus provides an integrated circuit including a programmable logic circuit (programmable logic device, PLD) and a control circuit which is coupled to the PLD. The control circuit is able to recognize that a reconfiguration criterion is met. In response to the fact that the reconfiguration criterion is met, the control circuit can configure the PLD to implement a secret operation by using one or multiple random arrangements, a first random configuration of the PLD resulting in a first circuit implementation which is different from, even though it is functionally equivalent to, a second circuit implementation which results from a second random configuration of the PLD.

SUMMARY

The present invention provides a system-on-chip and a security circuit including such a system. An advantage of this approach involves the improved protection against side-channel attacks, in particular with the aid of a differential side-channel attack (differential power attack, DPA), on cryptographic algorithms such as AES as well as the improved protection of so-called IP cores against reverse engineering (RE). The method is independent from cryptographic algorithms and the functionality of the circuit, which is to be protected and is described on a register transfer level (RTL), and arbitrarily transferable to or combinable with other countermeasures against physical attacks. In addition, it does not depend on specific elements, for example, randomly initiated VHDL or Verilog variables, of the hardware description in order to generate different implementation configurations. It is ensured, however, that the generated configurations vary strongly enough to provide sufficient protection against physical attacks.

A basic idea is, in this case, to generate on the processing system (PS) of an SoC automatically different physical configurations or partial configurations, with regard to the running time from the same RTL description and the netlist, synthesized therefrom, of an arbitrary circuit (for example cryptographic in one implementation) and to exchange these configurations continuously with the aid of partial reconfiguration of FPGAs.

An example embodiment is based on the recognition that SCA-resistant logic styles, typically implemented as so-called dual-rail precharge logic (DRP), represent a possibility of responding to an SCA at the cell level. According to such a logic style, the current consumption per logic cell in each cycle of operation is kept constant regardless of the value of the cell. The absolute current consumption of the cryptographic device is thereby to be kept constant regardless of the data processed and the operations performed. The respective refinement takes into account the fact that this is not possible if an attacker exploits the electromagnetic emanation (EM) of a static security circuit as side-channel information. In this manner, it is possible to perform very precise measurements on the respective chip in order to analyze local characteristics of the respective circuit for example with respect to placement and routing. The refinement solves this problem by a dynamic implementation of DRP. For this purpose, with the aid of a partial reconfiguration of FPGAs, certain parts of the circuit are swapped out dynamically with respect to the runtime of the device. Although the changes in the DRP circuit are functionally invariant, they differ with respect to placement and routing. This renders the above-described attack vector on DRP circuits ineffective or significantly harder to exploit. DRP thus becomes even more secure with the aid of the constant reconfiguration in accordance with the present invention.

In an example, the placement and routing in the FPGA toolchain is controlled in a targeted manner using certain strategies in order to achieve the largest possible diversity, for example with regard to the dynamic power consumption or signal delay, between the resulting circuits. A corresponding embodiment is based on the finding that changes in the routing of a circuit change the signal propagation times on the switching matrix (fabric) and thus have an effect on the dynamic power consumption.

According to another aspect, this effect is further amplified by an upstream new placing. This makes it considerably more difficult for an attacker to determine the exact time and location of sensitive operations. Since in this case, only placing and routing vary for each circuit configuration on the part of the FPGA toolchain, a repeated synthesis for the running time is not necessary, thus allowing new circuits to be generated faster and, in particular with regard to the required random access memory (RAM), more resource-efficiently on the PS.

Exemplary embodiments of the present invention are illustrated in the drawings and explained in greater detail in the description below.

DETAILED DESCRIPTION

Figure 1:
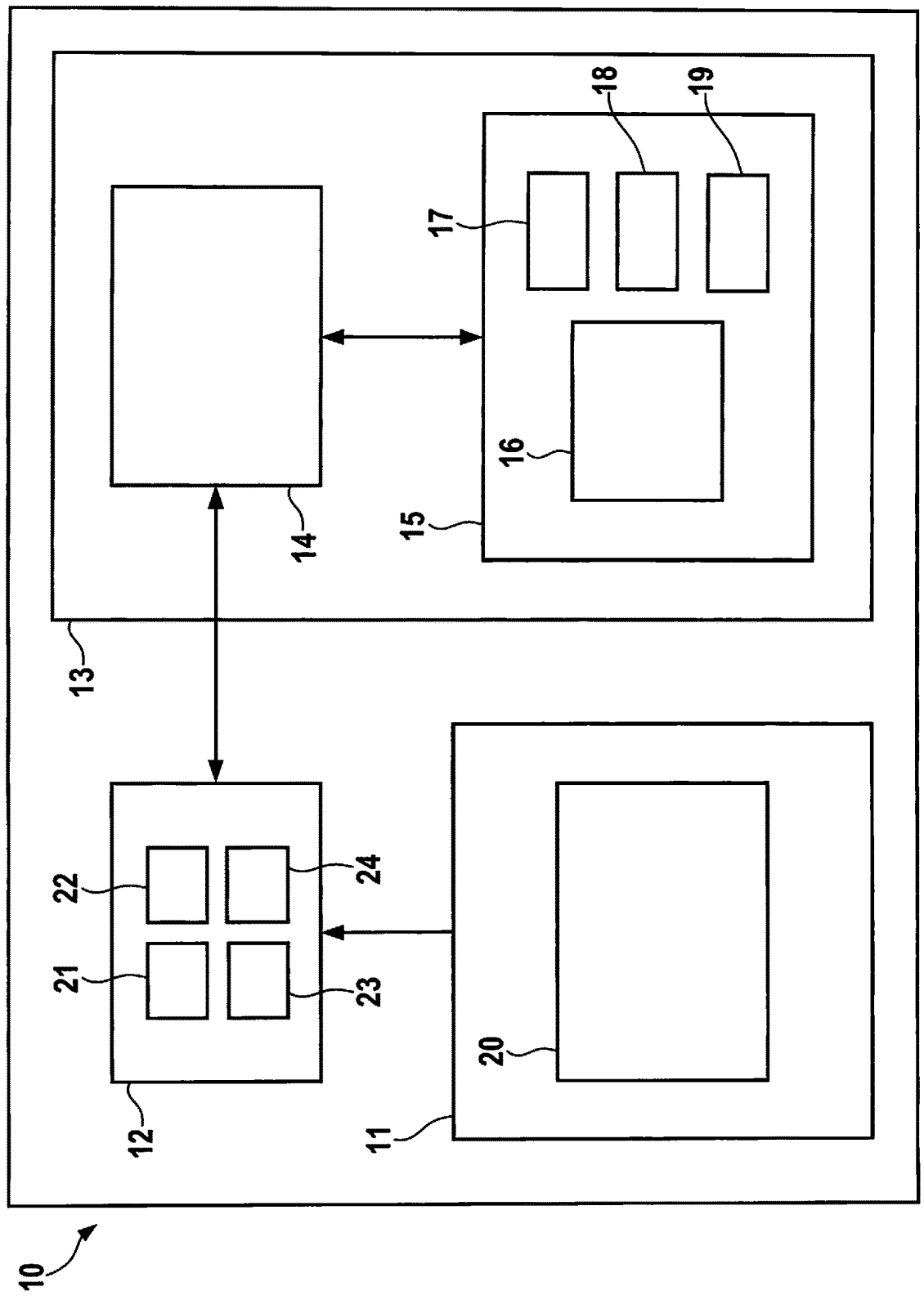
FIG. 1 shows an overall system on a system-on-chip according to an example embodiment of the present invention.

FIG. 1 is a simplified block diagram of an overall system according to an example embodiment of the present invention. As processing system 11, any arbitrary microprocessor can in principle be used, which corresponds to the ARM architecture, for example, and on which parts of an FPGA toolchain 20 can be carried out. The latter continuously generates new circuit configurations 30, 40 in the form of partial bit streams 21, 22, 23, 24 which can be stored, preferably encoded, on an external DRAM, or a different memory 12.

An FPGA switching matrix 13 is provided which implements a reconfiguration manager 14 and core logic 15 of programmable logic circuit 13 to be protected. Core logic 15 is further subdivided into a static area 16, for example a finite automaton which controls the general sequence, and one or multiple reconfigurable areas 17, 18, 19. With regard to the running time of system 10, reconfiguration manager 14 periodically (for example at a time interval of 100 ms in each case) reads partial bit streams 21, 22, 23, 24 from external memory 12, decodes them, and uploads them to one of reconfigurable areas 17, 18, 19. The advantage of multiple areas 17, 18, 19 of this type is that an interruption-free operation of system 10 can be ensured when exactly one area 17, 18, 19 in each case has a certain circuit configuration. The redundancy created by the simultaneous storage of multiple circuit configurations provides additional protection against unintentional or intentionally introduced errors.

To generate the different circuit configurations, various possibilities are contemplated without departing from the scope of the present invention. On the one hand, different open-source or proprietary tools can be used; on the other hand, the circuit generation can be effected at different stages of the FPGA design flow.

A generation of the different circuit configurations with the aid of Xilinx Vivado or the proprietary tools of other FPGA manufacturers, for example, yields an advantage of an integrated validation for each design step. It is thus ensured that a semantically correct circuit configuration is prepared for circuit 13 which is specified in HDL. However, when using proprietary tools of this type, the individual design steps are in most cases to be effected only indirectly via certain parameter settings and boundary conditions (constraints), since the algorithms for synthesis, placing, and routing are typically not documented by the provider. It is, however, also possible to generate markedly different configurations from one HDL description.

One way to achieve this provides, for example, for placing one or multiple logic cells of the synthesized netlist via a LOC constraint in a certain area of the FPGA switching matrix. Prior to every placing and routing, the logic cells are thus fixed in a different area or at a different location specified based on its x and y coordinates, for example in such a way that the Manhattan distance or another type of clearance between the old and the new location of the particular logic cell is maximal, a randomly selected offset being possibly taken into account. In this way, a different starting state is indirectly generated for the placing and routing.

Another method can involve excluding prior to every circuit generation randomly determined resource elements of FPGA 13, such as RAMs or configurable logic blocks (CLBs), with the aid of the PROHIBIT constraint of placing and routing. With regard to the limited performance of commercially available systems-on-chip it is moreover also conceivable to generate a different circuit configuration at each run-through only for certain sensitive parts of circuit 13, the so-called S-boxes in the case of cryptographic primitives, for example.

Figure 2:
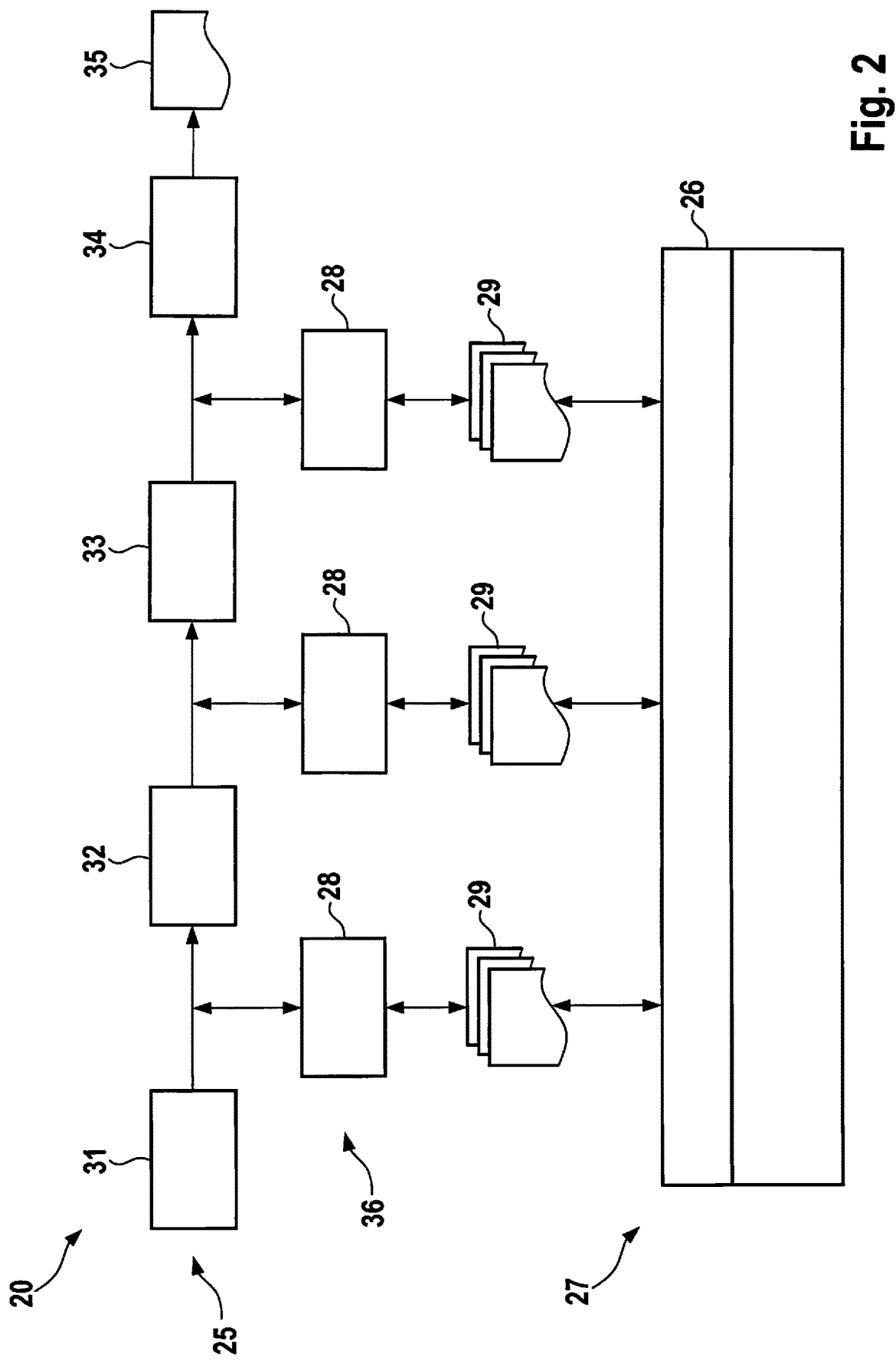
FIG. 2 schematically shows an FPGA design flow according to an example embodiment of the present invention.

By using certain open-source tools—within the context of Vivado, for example the RapidSmith2 (RS2) developed by the Brigham Young University in connection with the script library TINCR—it is possible to intervene in the FPGA design flow in order to implement a manual placing and routing for certain FPGAs, for example. In this case, it is possible to switch at will back and forth between the two tools, as is now illustrated based on FIG. 2.

In order to generate different circuit configurations and corresponding bit streams 21, 22, 23, 24, multiple approaches are conceivable which can be combined with one another:

1. Initially, synthesized 31 netlist is imported into RS2 27 and the logic cells are randomly placed. Thereafter, an export back to Vivado takes place and the usual design flow continues through routing 33 and to bit stream generation 34, 35.

2. Synthesized 31 netlist is imported into RS2 27 and the logic cells are placed by simulated annealing or a different type of a heuristic approximation method. In this case, different results can be achieved by varying the start and termination conditions of the method after each run-through. It is moreover possible to have influence over a modified cost function (in general the sum of the semi-perimeters of all subnetworks) by taking into account the difference with regard to the placing result of the previous run-through as an additional weighting factor. In terms of clearance, the Manhattan distance of the individual logic cells is contemplated once again.

3. Initially, a placing 32 takes place using Vivado, thereafter an export to RS2 27, and a manual routing, followed by a re-importation into Vivado and generation 34 of the bit stream. Standard routing algorithms can be used for the manual routing. They are essentially based on constructing a directed graph from the available routing resources (signal lines, switch boxes, etc.) and finding the shortest path between two end nodes in each case within this graph. This search preferably takes place following the Dijkstra algorithm or variants thereof. In this case, the edges of the graph are assigned a cost function which represents the physical distance between the connected nodes, among other things. Now, in order to generate different routing results and thus different circuit configurations 30, 40, it is possible to randomly change the edge weights for each run-through partially or for the entire graph.

Figure 3:
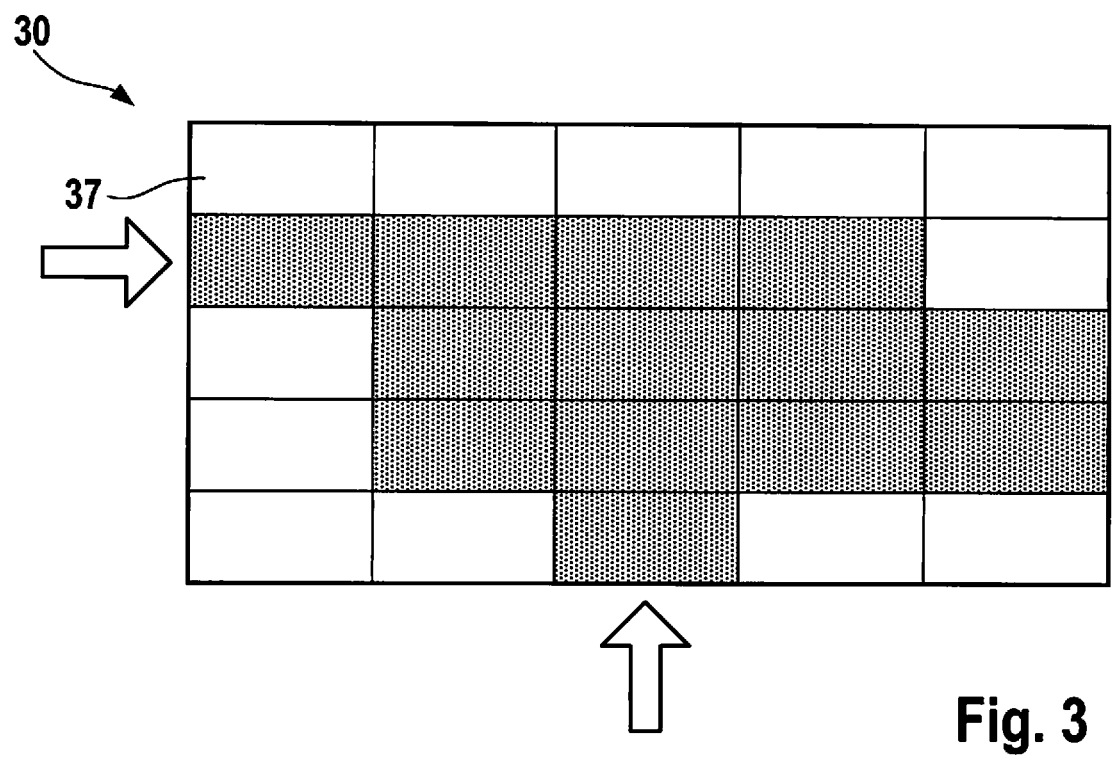
FIGS. 3 and 4 show possible changes in the circuit layout as a result of bit stream manipulation according to an example embodiment of the present invention.
Figure 4:
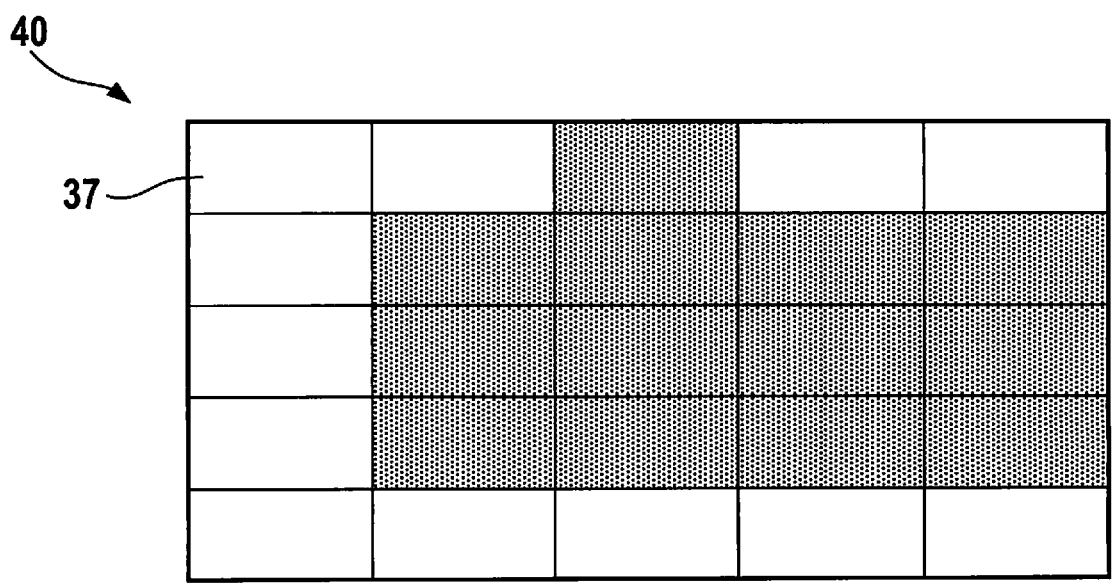

By using certain tools, for example the BITMAN developed at the University of Manchester, it is possible to directly change configuration bit streams 21, 22, 23, 24, in order to dynamically adapt the content of CLBs, for example. Furthermore, a bit stream manipulation of this type allows for individual routing resources, such as switch boxes, to be changed or entire FPGA regions (on CLB granularity) to be locally shifted. This, in turn, can be used to create new circuit configurations very quickly, without being dependent on time and resource-intensive CAD tools. With regard to the complexity of manipulations of this type, only smaller changes should be performed on bit streams 21, 22, 23, 24 in each case. Therefore, the procedure illustrated by a synopsis of FIGS. 3 and 4 is provided, where the configuration bits of logic blocks 37 of certain columns or lines of the FPGA switching matrix—which is comparable to a shift register—are each shifted by one position. The interchangeable connections (not illustrated in the drawing) between logic blocks 37 are adapted accordingly, so that the logic functionality of circuit 13 remains intact. Further shifting or placing strategies, for example from the area FPGA error tolerance, are also conceivable.

Preferably, system 10 is based on the DRP principle. Cells of such a DRP circuit 13 are constructed in complementary fashion, i.e., each signal is encoded using two lines. A valid logical signal exists if one line is set to 1 and the other to 0. In conjunction with a precharge, this structure necessitates that in each clock cycle the same signal transitions occur at the DRP cells and that thus at least theoretically the current consumption is kept constant (and independent of the data processed).

When implementing a DRP circuit on FPGAs 13, attention should be paid to ensure that the capacities of the complementary lines are balanced. This is normally ensured by special placing and routing methods that balance the line lengths. However, due to manufacturing variances and other influences, for example the operating temperature, signal delays occur in practice that make a perfect balancing difficult. Using the DRP logic alone it is therefore difficult to achieve a complete suppression of side-channel information.

For this reason and in order to render attacks as described above more difficult, the complete or particularly sensitive parts of the circuit are dynamically exchanged by way of partial FPGA reconfiguration with respect to the running time. The various configurations 30, 40 are functionally invariant, but have a different physical layout since they are based, as described above, on different placement 32 and routing 33 in order to obtain the advantages of the DRP circuit 13. This can be achieved, e.g., by manual placement 32 and routing 33 with the aid of RS2 27. An even greater protection against physical attacks such as side-channel and fault attacks is thereby achieved.

The present invention is not limited to a specific type of DRP logic, but can rather have many conceivable characteristics that are based on this concept, e.g., wave dynamic differential logic (WDDL) or sense amplifier based logic (SABL).

What is claimed is:

1. A system-on-chip comprising:
a memory;
a programmable logic circuit, which is a Field Programmable Gate Array (FPGA); and
a processor that implements an FPGA toolchain;
wherein:
the FPGA toolchain includes:
a draft tool adapted to:
synthesize a predefined netlist;
place and route cells of the FPGA according to the netlist;
based on the placement and routing, write bit files of bit streams, which form a plurality of circuit configurations that the processor is configured to store in the memory; and
export the circuit configurations to a checkpoint prior to the placing, routing, or writing;
further tools; and
an integration tool adapted to import the circuit configurations into the further tools for integrating the draft tool together with the further tools; and
the processor is configured to repeatedly adapt the programmable logic circuit to different ones of the circuit configurations stored in the memory.

2. The system-on-chip of claim 1, wherein:
the circuit includes a reconfiguration manager and a core logic; and
the reconfiguration manager is configured to repeatedly retrieve the circuit configurations from the memory and carry out respective changes on the core logic for respective ones of the retrieved circuit configurations.

3. The system-on-chip of claim 2, wherein:
the core logic includes a static area and reconfigurable areas; and
the changes are performed so that complete ones of the circuit configurations are configured in their respective entireties, each on a single one of the reconfigurable areas.

4. The system-on-chip of claim 1, wherein the toolchain further includes a script library, and the script library is adapted to store the circuit configurations as file archives.

5. The system-on-chip of claim 1, wherein:
the bit streams describe the FPGA based on configurable logic blocks of the circuit configurations; and
the processor is configured to change the netlist in a functionally invariant manner.

6. The system-on-chip of claim 1, wherein the circuit includes dual-rail precharge (DRP) logic.

7. The system-on-chip of claim 6, wherein the DRP logic is wave dynamic differential logic (WDDL).

8. The system-on-chip of claim 6, wherein the DRP logic is sense amplifier based logic (SABL).

9. A security circuit comprising a system-on-chip, wherein the system-on-chip includes:
a memory;
a programmable logic circuit, which is a Field Programmable Gate Array (FPGA); and
a processor that implements an FPGA toolchain;
wherein:
the FPGA toolchain includes:
a draft tool adapted to:
synthesize a predefined netlist;
place and route cells of the FPGA according to the netlist;
based on the placement and routing, write bit files of bit streams, which form a plurality of circuit configurations that the processor is configured to store in the memory; and
export the plurality of circuit configurations to a checkpoint prior to the placing, routing, or writing;
further tools; and
an integration tool adapted to import the circuit configurations into the further tools for integrating the draft tool together with the further tools; and
the processor is configured to repeatedly adapt the programmable logic circuit to different ones of the circuit configurations stored in the memory.

* * * * *